United States Patent
Shimada

[19]

[11] Patent Number: 6,052,137
[45] Date of Patent: Apr. 18, 2000

[54] TICKET AND TICKET REWRITING APPARATUS

[75] Inventor: Naoki Shimada, Tokyo-To, Japan

[73] Assignee: Dai Nippon Printing Co., Ltd., Japan

[21] Appl. No.: 08/702,492

[22] PCT Filed: Dec. 28, 1995

[86] PCT No.: PCT/JP95/02759

§ 371 Date: Aug. 27, 1996

§ 102(e) Date: Aug. 27, 1996

[87] PCT Pub. No.: WO96/20092

PCT Pub. Date: Jul. 4, 1996

[30] Foreign Application Priority Data

Dec. 28, 1994 [JP] Japan ................................ 6/337693

[51] Int. Cl.[7] ............................................. B41J 5/32
[52] U.S. Cl. ................................. 347/171; 235/432
[58] Field of Search ............................. 347/171, 221;
400/120.01; 5/20; 359/44; 428/1; 235/492, 432

[56] References Cited

U.S. PATENT DOCUMENTS

| | | | |
|---|---|---|---|
| 4,702,945 | 10/1987 | Etzbach et al. | 428/1 |
| 5,055,662 | 10/1991 | Hasegawa | 235/492 |
| 5,321,239 | 6/1994 | Masubuchi et al. | 235/380 |
| 5,548,420 | 8/1996 | Koshimizu et al. | 359/44 |
| 5,559,314 | 9/1996 | Ohno et al. | 235/432 |
| 5,589,237 | 12/1996 | Akashi et al. | 428/1 |

FOREIGN PATENT DOCUMENTS

| | | |
|---|---|---|
| 0 344 789 A2 | 12/1989 | European Pat. Off. . |
| 0 345 980 A2 | 12/1989 | European Pat. Off. . |
| 0 426 163 A1 | 5/1991 | European Pat. Off. . |
| 1-165286 | 11/1989 | Japan . |
| 4-60891 | 2/1992 | Japan . |
| 6-3631 | 1/1994 | Japan . |
| 6-84210 | 3/1994 | Japan . |
| 6-258622 | 9/1994 | Japan . |

OTHER PUBLICATIONS

PATENT ABSTRACTS OF JAPAN, vol. 016, No. 205 (P–1353), May 15,1992 & JP 04 034517 A (Victor Co. of Japan Ltd), Feb. 5, 1992 Abstract.

*Primary Examiner*—N. Le
*Assistant Examiner*—Anh T. N. Vo
*Attorney, Agent, or Firm*—Parkhurst & Wendel, L.L.P.

[57] ABSTRACT

A ticket capable of recording visible information so that the information is difficult to erase and a ticket rewriting apparatus capable recording visible information on conditions of use on the ticket are used to prevent the dishonest use of the ticket. The ticket comprises a base, a rewritable displaying device mounted on one surface of the base and an information recording device formed on the other surface of the base and having a magnetic recording layer. The rewritable displaying device comprises a reversible displaying element having a polymer dispersed liquid crystal film (PDLC film) capable of being repeatedly subjected to a visible information recording and a visible information erasing. Information rewriting requires both heat and an electric field for information rewriting. Conditions of use including the time and date of use are recorded on the rewritable displaying device and the information recording device. The ticket rewriting apparatus comprises a device including a charger and electrodes for applying an electric field to the rewritable displaying unit, and a device including a thermal head for applying heat to the rewritable displaying device.

11 Claims, 5 Drawing Sheets

TICKET AND TICKET REWRITING APPARATUS

TECHNICAL FIELD

The present invention relates to a ticket as a certificate of admission to transportation facilities, such as a commuter ticket or a book of tickets, and, more specifically, to a ticket that allows repetitive writing of the contents of information to be displayed thereon, and a ticket rewriting apparatus for rewriting the contents of information to be displayed on the ticket.

BACKGROUND ART

A ticket provided with a magnetic recording layer has prevalently been used, and a person using a commuter ticket puts the commuter ticket in an automatic ticket examining machine to gain admission to pass a ticket barrier. In some cases, a commuter ticket is used dishonestly to steal a train ride from a starting station outside a section specified on the commuter ticket to a destination in the specified section by using a ticket to gain admission to transport facilities at the starting station and using the commuter ticket to gain admission to leave transportation facilities at the destination without paying for the middle part of the journey. Such dishonest use of a commuter ticket can be detected somehow by recording the time and date of entrance as an evidence for the use of the commuter ticket at the starting station by the automatic ticket examining machine, inspecting the commuter ticket to see whether or not the time and date of entrance is recorded on the commuter ticket, and comparing the time and date of entrance with the time and date of exit.

However, if the user of the commuter ticket passes a ticket barrier where the station staff inspect the commuter ticket visually, it is difficult to detect the dishonest use of the commuter ticket and it is impossible to prevent surely the dishonest use of the commuter ticket.

Accordingly, there has been a demand for a ticket that enables automatic ticket examination and visual ticket examination to prevent the dishonest use thereof, and for a recording means for printing visually recognizable information indicating conditions of use including the date of use on a ticket to be used repeatedly, such as a commuter ticket, every time the ticket is used.

Various reversible displaying elements to which visible information is rewritable have been proposed. Mode of display of those reversible displaying elements changes when energy is applied temporarily to those reversible displaying elements by an external energy source, and the displayed information is held after energy has been removed to maintain a recording state. Thus, these reversible displaying elements utilize a displayed information storing property.

For example, one of the previously proposed reversible displaying elements employs a polymer-fatty-acid film of a material prepared by dispersing a fatty acid in a polymer matrix to utilize the properties of the fatty acid that changes between a white, opaque phase and a transparent phase. Another previously proposed reversible displaying element utilizes the reversible opening and closing of lactone rings of a leuco dye by a developer/subtracter agent. A third previously proposed reversible displaying element employs a polymer liquid crystal.

When those known reversible displaying elements are applied to a ticket, information can be written to the polymer-fatty-acid film at a relatively high processing speed; however, the possible number of cycles of high-speed writing process (for example, a writing process at a processing speed of several milliseconds using a thermal head) is as small as about fifty. Since the reversible displaying element employing the polymer-fatty-acid film uses white opaqueness as a light-scattering state and specular reflection as a transparent state, the reversible displaying element is inferior in the visibility of displayed information. The reversible displaying element employing the leuco dye or the polymer liquid crystal requires several seconds for erasing and is not satisfactory in the number of cycles of rewriting process.

Furthermore, since those known reversible displaying elements carry out both visible information printing (recording) and visible information erasing in a heat-heat mode in which heat is used for both visible information printing and visible information erasing, displayed characters are easy to alter dishonestly when the those known reversible displaying elements are employed in a ticket.

Accordingly, it is an object of the present invention to provide a ticket as a certificate of admission to transport facilities, such as a commuter ticket, employing a reversible displaying element that enables high-speed rewriting process, is capable of enduring a large number of cycles of rewriting process and makes dishonest alteration difficult, and a ticket rewriting apparatus for rewriting the contents of information to be displayed to the ticket.

DISCLOSURE OF THE INVENTION

With the foregoing object in view, according to a first aspect of the present invention, a ticket comprises: a base; an information recording device mounted on the base and capable of recording invisible information; and a rewritable displaying device mounted on the base and capable of being repeatedly subjected to a visible information recording and a visible information erasing, wherein the rewritable displaying device is provided with a reversible displaying element which is changed from one of a recording state and an erasing state to the other by the agency of an electric field and from the latter state to the former state by the agency of heat.

According to a second aspect of the present invention, the reversible displaying element of the ticket is changed from a recording state to an erasing state by the agency of an electric field.

According to a third aspect of the present invention, the reversible displaying element of the ticket includes a polymer dispersed liquid crystal film.

According to a fourth aspect of the present invention, a liquid crystal phase of the polymer dispersed liquid crystal film of the ticket contains a dichroic dye that assumes a displaying state by the guest-host effect.

According to a fifth aspect of the present invention, the reversible displaying element of the ticket further comprises a conductive layer underlying the polymer dispersed liquid crystal film, and a protective layer overlying the polymer dispersed liquid crystal film.

According to a sixth aspect of the present invention, the information recording device of the ticket comprises a magnetic recording layer.

According to a seventh aspect of the present invention, the information recording device of the ticket is formed on one of the surfaces of the base, and the rewritable displaying device of the same is formed on the other surface of the base.

According to an eighth aspect of the present invention, the information recording device is formed in the entire area of one of the surfaces of the base, and the rewritable displaying device of the same is formed in a portion of the other surface of the base.

According to a ninth aspect of the present invention, a ticket rewriting apparatus for writing information to and erasing information written to a ticket comprising a base, an information recording device mounted on the base and capable of recording invisible information, and a rewritable displaying device mounted on the base and capable of repeatedly subjected to a visible information recording cycle and a visible information erasing cycle, wherein the rewritable displaying device is provided with a reversible displaying element which is changed from one of a recording state and an erasing state to the other by the agency of an electric field and from the latter state to the former state by the agency of heat, comprises an electric field applying means for applying an electric field to the rewritable displaying device to change a displaying state of the rewritable displaying device, and a heating means for applying heat to the rewritable displaying device to change another displaying state of the rewritable displaying device.

According to a tenth aspect of the present invention, the electric field applying means sets the rewritable displaying device in an erasing state, and the heating means sets the rewritable displaying device in a recording state.

According to an eleventh aspect of the present invention, the ticket rewriting apparatus further comprises a recording-reading-erasing means for recording information on, reading information from and erasing information from the information recording device.

According to a twelfth aspect of the present invention, the electric field applying means of the ticket rewriting apparatus has electrodes to be brought into contact with the surface of a ticket to charge the ticket at a ground potential, and the electrodes serve also as the recording-reading-erasing means for recording information on, reading information from and erasing information from the information recording device.

According to the first aspect of the present invention, invisible information is recorded on the information recording device, and visible information can be repeatedly recorded on and erased from the rewritable displaying device employing the reversible displaying element. A recording operation for recording information on the rewritable displaying device uses the former or the latter of heat and an electric field, and an erasing operation for erasing information from the rewritable displaying device uses the latter or the former of heat and an electric field. Thus, recording and erasing use different processing means, respectively, and both different kinds of external energy, i.e., heat and an electric field, are used when erasing recorded visible information and recording new visible information.

According to the second aspect of the present invention, visible information is recorded, i.e., visible information is rewritten, by the agency of an electric field.

According to the third aspect of the present invention, the reversible displaying element comprises a polymer dispersed liquid crystal film with an excellent performance.

According to the fourth aspect of the present invention, the guest-host effect of the dichroic dye improves the contrast of information displayed on the rewritable displaying device.

According to the fifth aspect of the present invention, the reversible display element employs the conductive layer, and the protective layer protects the reversible displaying element.

According to the sixth aspect of the present invention, the information recording device comprises the magnetic recording layer on which information can be recorded and from which information can be erased by the agency of a magnetic field.

According to the seventh aspect of the present invention, the information recording device and the rewritable displaying device are exactly separated from each other and a large amount of information can be recorded.

According to the eighth aspect of the present invention, the rewritable displaying device can be disposed at a desired position on the base.

According to the ninth aspect of the present invention, in the ticket having the information recording device capable of recording invisible information, and the reversible displaying element on which visible information is recorded and from which visible information is erased, the rewritable displaying device is changed from one of a recording state and an erasing state to the other by the electric field applying means, and the rewritable displaying device is changed from one of a recording state and an erasing state set by the electric field applying means to the other by the heating means.

According to the tenth aspect of the present invention, information recorded on the rewritable displaying device is erased by an electric field, and information is recorded on the rewritable displaying device by heat.

According to the eleventh aspect of the present invention, the recording, reading and erasing means records invisible information on, reads information recorded on and erases information from the information recording device.

According to the twelfth aspect of the present invention, a magnetic head, for instance, serves as the recording, reading and erasing means for recording information on, reading information recorded on and erasing information from the information recording device, and as grounding electrode for the electric field applying means for applying an electric field to the rewritable displaying device.

BEST MODE FOR CARRYING OUT THE INVENTION

Tickets and a ticket rewriting apparatus embodying the present invention will be described hereinafter with reference to the accompanying drawings.

Figure 1:
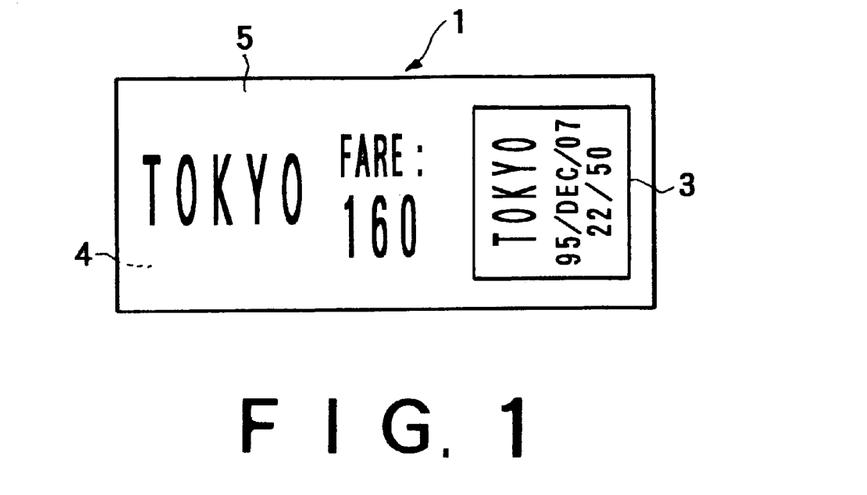
FIG. 1 is a top plan view of a ticket (one of a book of tickets) in a preferred embodiment according to the present invention.

FIG. 1 is a top plan view of one of a book of tickets in a preferred embodiment according to the present invention to gain admission to transport facilities, such as a train. Referring to FIG. 1, a ticket 1 has an information recording portion or device 4 comprising a magnetic recording layer forming the entire back surface of the ticket 1, and a rewritable displaying portion or device 3 forming a portion of the front surface of the ticket 1. Since the ticket shown in FIG. 1 is valid for a specified train section, permanent visible information 5 including the specified train section, fare and such is recorded on the front surfaces of the tickets by a known means, such as printing. Data indicating conditions of use including the starting station, the time and date of entrance and such is recorded and displayed on the rewritable displaying portion 3. The data indicating conditions of use is recorded also on the information recording portion 4 on the backside of the ticket 1.

Figure 2:
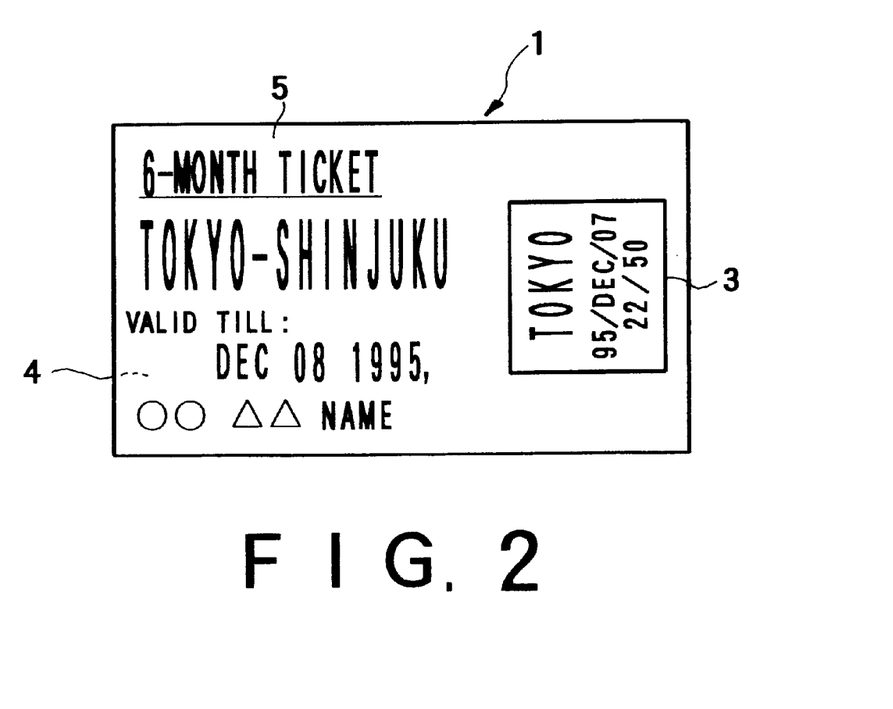
FIG. 2 is a top plan view of a ticket (commuter ticket) in another embodiment according to the present invention.

FIG. 2 is a top plan view of a ticket in another embodiment according to the present invention in the form of a commuter ticket for gaining admission to transport facilities, such as a train. Referring to FIG. 2, a ticket 1 has an information recording portion 4 comprising a magnetic recording layer forming the entire back surface of the ticket 1, and a rewritable displaying portion 3 forming a portion of the front surface of the ticket 1. Permanent visible information 5 including a specified train section, the term of validity, the name of the user and such is recorded on the front surfaces of the tickets by a known means, such as printing. Data indicating conditions of use including the starting station, the time and date of entrance and such is recorded and displayed on the rewritable displaying portion 3. The data indicating conditions of use is recorded also on the information recording portion 4 on the backside of the ticket 1.

Figure 3:
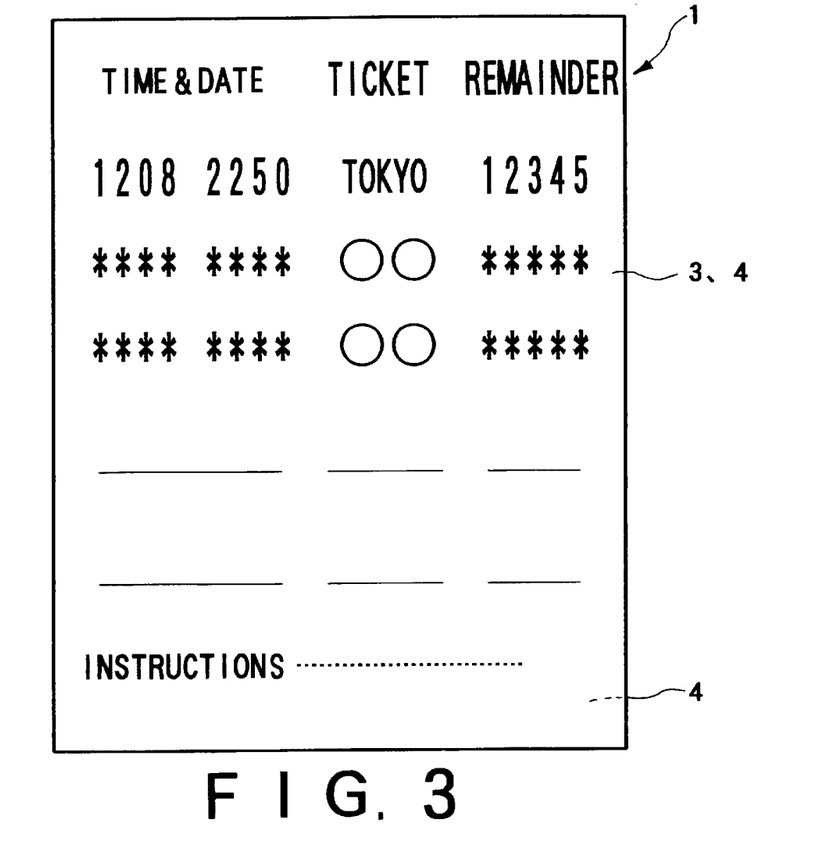
FIG. 3 is a top plan view of a ticket (stored fare card) in a further embodiment according to the present invention.

FIG. 3 is a top plan view of a ticket in a further embodiment according to the present in the form of a stored fare card, i.e., a kind of prepaid card. Referring to FIG. 3, a ticket 1 has an information recording portion 4 comprising magnetic recording layers forming the entire front and the entire back surface of the ticket 1, and a rewritable displaying portion 3 overlying the information recording portion 4. Condition of use including the starting station, the time and date of entrance and such are recorded and displayed on the rewritable displaying portion 3. The conditions of use are recorded also on the information recording portion 4.

Tickets in accordance with the present invention are not limited to the foregoing embodiments and may be embodied in various forms; for example, the rewritable displaying portion 3 may form the entire front surface of the ticket, and the information recording portion 4 may form the entire back surface of the ticket. There is no particular restriction on the size of the ticket; the ticket may be formed in an appropriate size according to purposes.

A reversible displaying element capable of being used as the rewritable displaying portion for a ticket will be described hereinafter.

A reversible displaying element to be applied to a ticket in accordance with the invention needs both heat and an electric field for rewriting, which makes the dishonest alteration of information displayed on the ticket difficult.

A liquid crystal displaying element employing a polymer dispersed liquid crystal film (hereinafter referred to as "PDLC film") formed by dispersing a smectic liquid crystal or the like in a polymer matrix is a possible reversible displaying element.

The principle of recording visible information on and erasing visible information from the PDLC film uses light scattering and light transmission (change in the light absorptive power when a dichroic dye is used in combination with the liquid crystal and guest-host effect is available) due to the orderly change of the orientation of the liquid crystal molecules (change between a homeotropic orientation state or a homogeneous orientation state, and a random orientation state) by heat and an electric field (heat-electric field mode). When an opaque state (light scattering state) is used as a recording state, and a transparent state (light transmitting state) is used as an erasing state, information can be written to the PDLC film with a heating means, such as a thermal head capable of spot-heating, and information can be erased from the PDLC film by holding the PDLC film, for instance, between electrodes and applying an electric field of an intensity exceeding a threshold for orienting the liquid crystal.

The PDLC film, as compared with the aforesaid conventional reversible displaying elements to which information is written and from which information is erased by a heat-heat mode, has an excellent performance optimum for tickets. The PDLC film has an ability to enable quick writing because the orientation state can quickly be established in a time on the order of microseconds by the application of an electric field, and withstands a sufficiently large number of writing cycles, and is capable of displaying information in a satisfactory visibility when a dichroic dye is used in combination. Since too kinds of external energy are necessary for rewriting, the dishonest alteration of information displayed on the PDLC film is difficult, information displayed on the PDLC film is hardly caused to fade away by natural environmental conditions and hence the PDLC film is able to display information with high reliability.

A PDLC film proposed in, for instance, JP-A No. 4-71899 may be employed. A PDLC film employing a microcapsulated liquid crystal has excellent properties such that the liquid crystal does not exude because the liquid crystal is sealed in microcapsules. Films proposed by the applicant of the present patent application in JP-A Nos. 5-301489, 6-33283, 6-44735 and 6-119702 may be used.

Suitable polymers for use as the polymer matrix binding the liquid crystal dispersed therein to form the PDLC film are, for example, vinyl chloride resins, such as a vinyl chloride resin and a vinyl-chloride-vinyl-acetate copolymer, vinylidene chloride resins, acrylic resins, such as a polymethacrylate resin and an acrylate-methacrylate copolymer, polyvinyl alcohol resins, polycarbonate resins, polyester resins, epoxy resins, polyamide resins, polyurethane resins, polythiol resins, and a radiation-setting resin that sets when exposed to ultraviolet rays or electron rays or the like.

The liquid crystal employed in the PDLC film may be a smectic liquid crystal, a nematic liquid crystal, a cholesteric liquid crystal, a polymer liquid crystal or a mixture of some of those liquid crystals. The visibility can be improved by mixing the liquid crystal with an appropriate amount of a dichroic dye to enhance the displaying contrast by the guest-host effect.

The liquid crystal can be dispersed in the polymer matrix by any one of a phase separation method, an emulsion method, a microcapsule method, a solvent evaporation method and a suspension polymerization method. Among those methods, a emulsion method and a microcapsule method are most preferable because those methods prevent the liquid crystal from exuding. The microcapsule method improves the durability of the dispersed liquid crystal particles. A microcapsule method using an in situ polymerization process is able to form the PDLC film containing liquid crystal particles of 10 μm or below in particle size, which is suitable for forming the PDLC film in a practically appropriate thickness and for securing a satisfactory display quality.

Generally, the thickness of the PDLC film is in the range of about 3 to about 23 μm. The lower limit thickness of the PDLC film is dependent on the displaying contrast and the upper limit thickness of the same is dependent on a practical driving voltage necessary for setting the liquid crystal of the PDLC film in an oriented state.

The layered structure of a liquid crystal displaying element, i.e., the reversible displaying element, comprises at least the PDLC film and an electric field applying means for applying an electric field perpendicularly to the PDLC film. Although the electric field applying means may comprise electrodes for holding the PDLC film therebetween, the electric field applying means may comprise only a back electrode, and an external electrode may be employed as a front electrode to apply an electric field to optional portions of the PDLC film. Therefore, the reversible displaying element comprises, at least, a base sheet, i.e., a substrate, an electrode, i.e., a conductive layer, and a PDLC film. A protective layer may be formed on the PDLC film when necessary.

The construction of the ticket of the present invention provided with the reversible displaying element will be described in detail hereinafter.

Figure 4:
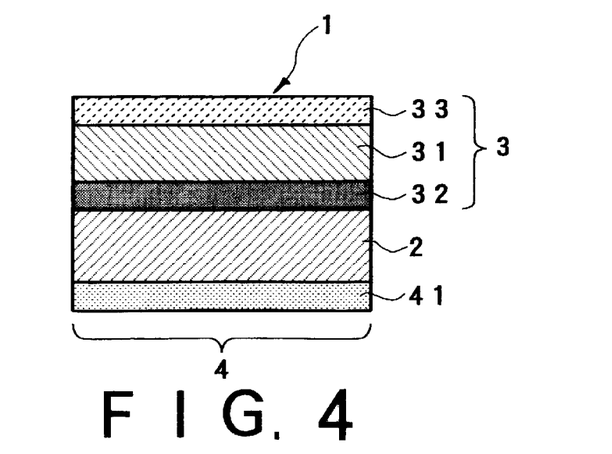
FIG. 4 is a longitudinal sectional view of the ticket of FIG. 1.

FIG. 4 is a longitudinal sectional view of the ticket 1 of a layered construction of the present invention. As shown in FIG. 4, the ticket 1 has a base 2, a rewritable displaying portion 3 formed on the front surface, i.e., an upper surface as viewed in FIG. 4, of the base 2 so as to cover the front surface of the base 2 entirely, and an information recording portion 4 comprising a magnetic recording layer 41 formed on the back surface of the base 2 so as to cover the back surface entirely. A construction shown in FIG. 4 is a basic construction having the rewritable displaying portion 3 and the information recording portion 4 forming the entire surfaces of the ticket 1. In a construction shown in FIG. 5, the writable displaying portion 3 is formed in a portion of a surface of a base 2 of a ticket 1. Thus, the rewritable displaying portion 3 is formed so as to cover the entire area or a portion of the surface of the base 2. The component layers of the rewritable displaying portion 3 are formed by a coating method or a printing method when the rewritable displaying portion 3 is formed so as to cover the entire area of the base 2, or formed by a printing method or a transfer method when the same is formed in a portion of the surface of the base 2.

Figure 5:
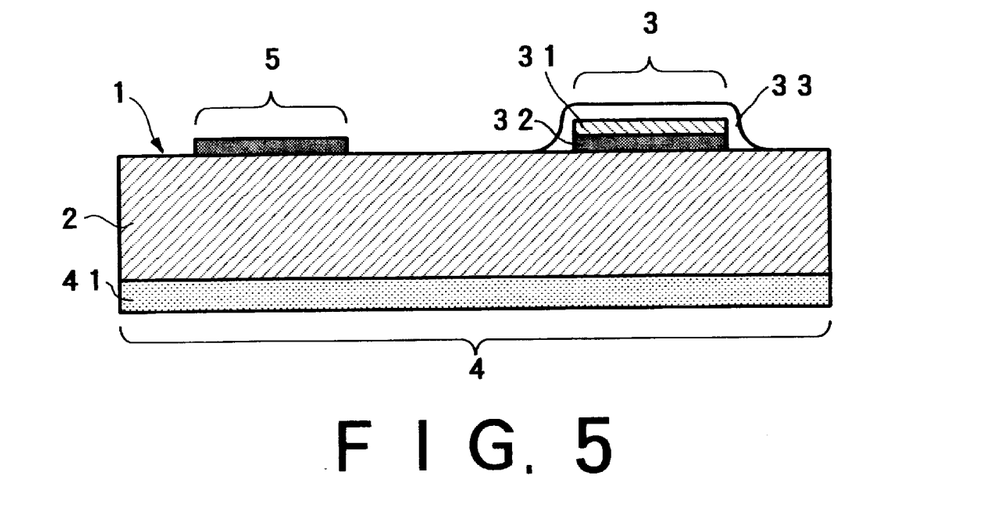
FIG. 5 is a longitudinal sectional view of the ticket of FIG. 2.

The rewritable displaying portion 3 of each of the tickets 1 shown in FIGS. 4 and 5 has a PDLC film 31. The rewritable displaying portion 3 is a reversible displaying element comprising a conductive layer 32, the PDLC film 31 and a protective layer 33 stacked in layers in that order. The protective layer 33 of the ticket shown in FIG. 5 is formed so as to cover the side surfaces of the PDLC film 31 and the conductive layer 32. Permanent visible information 5 is recorded by printing or the like in a portion of the surface of the base 2 not covered with the rewritable displaying portion 3.

Figure 6:
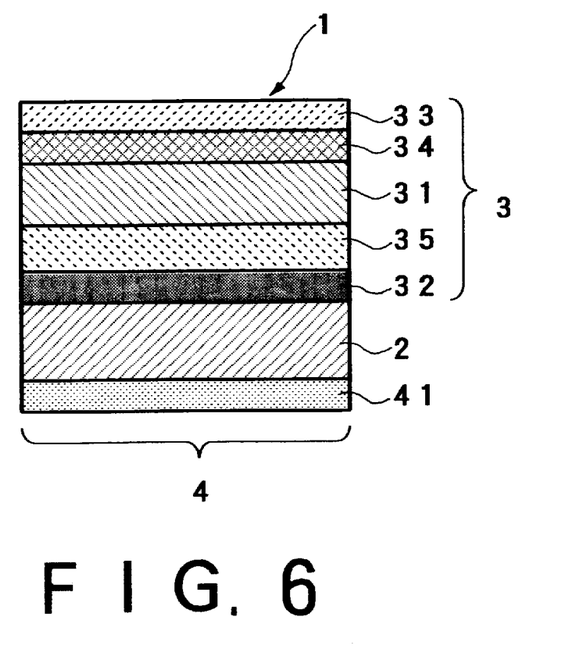
FIG. 6 is a longitudinal sectional view of a ticket in still a further embodiment according to the present invention.

An intermediate layer 34 may be formed between the PDLC film 31 and the protective layer 33, and an adhesive layer 35 may be formed between the PDLC film 31 and the conductive layer 32 as shown in FIG. 6. The intermediate layer 34 protects the PDLC film 31 from damage when forming the protective layer 33 by a coating method or the like, and the adhesive layer 35 improves the adhesion of the PDLC film 31 to the conductive layer 32.

The base 2 may be a sheet or a plate of a polyester resin, such as polyethylene terephthalate, a vinyl chloride resin, such as a polyvinyl chloride, an olefin resin, such as polypropylene, an acrylic resin, such as methyl polymethacrylate, a styrene resin, such as polystyrene, a cellulose resin, such as cellulose triacetate; a paper sheet, such as a coated paper sheet, a synthetic paper sheet, a metal foil, a ceramic sheet or a composite sheet or plate of some of those materials. The thickness of the base 2 is determined according to purposes and is in the range of about 50 to about 1000 μm. Normally, the base 2 is an insulating sheet. The base 2 may be formed of a material having an appropriate electric conductivity and the conductive layer may be omitted.

The surface of the base 2 may be treated to improve adhesion between the base 2 and the conductive layer 32 or the magnetic recording layer 41 by a known surface treatment, such as a corona treatment or a primmer treatment with a silane coupling agent or a urethane resin.

The conductive layer 32 may be formed of a semiconductor having an electric conductivity that enables the conductive layer 32 to serve as a horizontal electrode to apply an electric field perpendicularly to the PDLC film 31, for example, a semiconductor having a sheet resistivity of $10^{12}$ Ω/sq. or below. However, in view of suppressing voltage loss, it is preferable that the conductive layer 32 has a high electric conductivity. The conductive layer 32 may be, for example, an evaporated metal film or a metal foil of aluminum or the like, a transparent conductive film, such as an ITO film, or a conductive paint film containing carbon black or the like. When the magnetic recording layer 41 is formed on the front surface of the base 2 and the conductive layer 32 is formed on the magnetic recording layer 41, the conductive layer 32 is a film having a masking property, such as a film of a white, conductive paint, aluminum paste or evaporated aluminum. When the conductive layer 32 overlies the magnetic recording layer 41, the conductive layer 32 is formed in a thickness that will not hinder operations to record information on and reading information from the magnetic recording layer 41.

As mentioned above, the base 2 is a insulating resin or paper sheet. If the resin or paper sheet has a required conductivity (volume resistance of $10^8$ Ω or below at the thickness of the base), the base 2 may serve also as the conductive layer 32, and a magnetic field can be applied through the front and the back surface of the ticket 1 through the base 2.

The protective layer 33 protects the PDLC film 31 from pressure, external force and the ambient conditions and enhances the resistance of the PDLC film 31 against heat, abrasion and scratching actions exerted thereon by a thermal head and such included in a ticket rewriting apparatus. The protective layer 33 may be a film of a hardenable resin, such as a thermosetting resin or a radiation-setting resin that hardens when exposed to ultra-violet rays or electron rays. The protective layer 33 is formed by spreading a material containing the aforesaid resin or an ink, and additives including a surface lubricant, such as wax, over part of or the entire surface of the PDLC film 31. The thickness of the protective layer 33 is in the range of about 0.5 to about 10 μm. The protective layer 35 may be formed so as to cover the PDLC film 31 or areas excluding an area in which the PDLC film 31 is formed and the side surfaces of the PDLC film 31, i.e., areas other than that in which the rewritable displaying device 3 is formed, for example, the surface of the conductive layer 32, the surface of the permanent visible information or the entire area of the surface of the base 2. When the protective film 33 is formed so as to cover the surface of the base 2 entirely, the protective film 33 is formed of a resin, such as a polyethylene terephthalate.

When forming the protective layer 33 by spreading a dope, the protective layer 33 may be formed over the intermediate layer 34 formed by spreading a dope that may not affect the liquid crystal adversely. The intermediate layer 34 serves as a barrier layer that then prevents the permeation of the solvent contained in the dope into the PDLC film 33 and the deterioration of the liquid crystal orienting performance of the PDLC film 31. The intermediate layer 34 is formed by spreading an aqueous solution of a water-soluble resin, such as polyvinyl alcohol, polyvinyl pyrrolidone, carboxymethyl cellulose or starch. The thickness of the intermediate layer 34 is in the range of about 0.5 to about 10 $\mu$m. The thicknesses of the protective layer 33 and the intermediate layer 34 are determined so that an excessively high voltage is not necessary for electric field application.

The intermediate layer 34 increases the degree of freedom in selecting the resin for forming the protective layer 333. For example, the protective layer 35 of a radiation-setting resin, such as a soft urethane acrylate, is excellent in heat resistance, abrasion resistance, scratch resistance, touch to a thermal head and cushioning performance.

The information recording portion 4 may comprise, for instance, a magnetic recording layer 41 for magnetic recording. The magnetic recording layer 41 may be a film of a mixture of a resin as a binder, and magnetic powder, or a magnetic film formed by vacuum evaporation or sputtering. Normally, the thickness of the magnetic recording layer 41 of a mixture of a binding resin and magnetic powder is in the range of about 5 to about 10 $\mu$m. The magnetic recording layer 41 may contain a conductive substance, such as carbon black, to use the magnetic recording layer 41 also as a conductive layer for the reversible displaying element. Therefore, the magnetic recording layer 41 may be formed at a place other than the back surface of the base 2. For example, the magnetic recording layer 41 may underlie the reversible displaying element serving as the rewritable displaying portion 3 on the front surface of the base 2. When the magnetic recording layer 41 is formed on the side of the front surface of the base 2, the magnetic recording layer 41 overlies or underlies the conductive layer 31 or may serve also as the conductive layer 32. The magnetic recording layer 41 may be disposed so a not to overlap the rewritable displaying portion 3.

The information recording portion 4 may be of any type provided that the information recording portion 4 is able to record information in an invisible state. When the ticket 1 is as thick as a plastic card, an optical storage device or a semiconductor storage device may be formed on the surface or the interior of the base 2.

A ticket rewriting apparatus in accordance with the present invention will be described hereinafter as applied to the foregoing ticket 1 of the present invention having the rewritable displaying portion 3 comprising the PDLC film 31 by way of example on an assumption that the rewritable displaying portion 3 is set in an erasing state by an electric field and in a recording state by heat.

Figure 7:
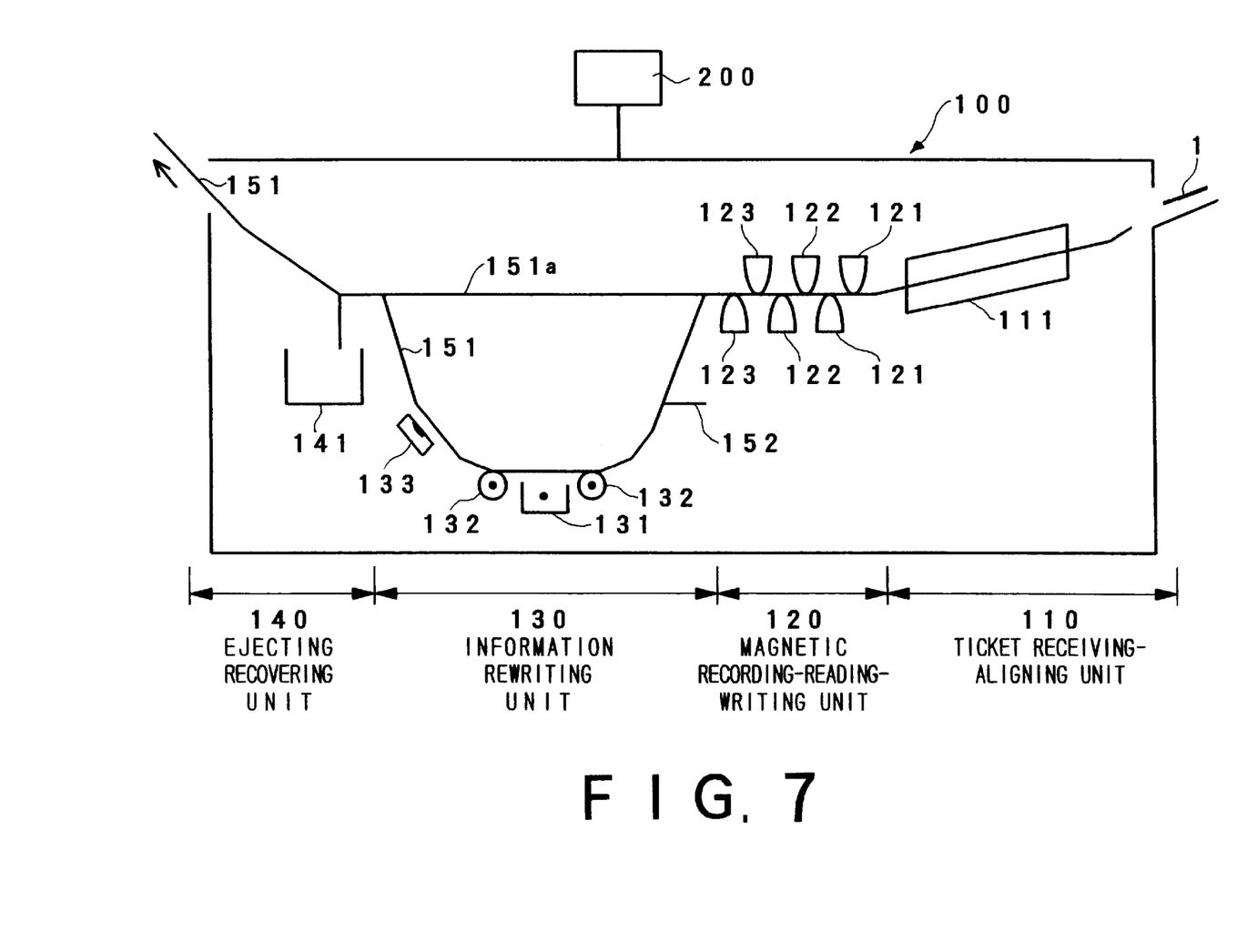
FIG. 7 is a diagrammatic view illustrating the construction of a ticket rewriting apparatus for processing a ticket in accordance with the present invention.

Referring to FIG. 7 schematically showing a ticket rewriting apparatus 100 in a preferred embodiment according to the present invention, the ticket rewriting apparatus 100 is designed for use as an automatic ticket examining machine to be installed at a railroad station. The ticket rewriting apparatus 100 comprises, as principal components, a ticket receiving-aligning unit 110, a magnetic recording-reading-writing unit 120, an information rewriting unit 130 and an ejecting-recovering unit 140. The ticket rewriting apparatus 100 further comprises a conveying mechanism including ticket conveyor belts 151 for conveying a ticket, and a controller 200, such as a CPU, for controlling the general operations of the ticket rewriting apparatus 100. The components of the ticket rewriting apparatus 100, excluding the information rewriting unit 130, may be similar to those of a known automatic ticket examining machine.

When a ticket 1 is deposited in the ticket rewriting apparatus 100, the conveying mechanism including the ticket conveyor belts 151 conveys the ticket 1 to the ticket receiving-aligning unit 110 to align the ticket 1 by an aligning mechanism 111. Subsequently, the ticket 1 is delivered to the magnetic recording-reading-writing unit 120 comprising magnetic recording heads 121, magnetic writing heads 122 and magnetic reading heads 123. The magnetic recording-reading-writing unit 120 writes information to or read information from the information recording portion 4 of the ticket 1, and examines the ticket 1 by the magnetic reading head 123 to see whether or not information is written to the ticket 1. Since two sets each of the magnetic heads 121, 122 and 123 are disposed on the opposite sides of a path of the ticket 1, the ticket 1 may be deposited in the ticket receiving-aligning unit 110 either with the front surface of the ticket 1 facing up or with the same facing down.

Then, the ticket 1 is delivered to the information writing unit 130. When it is found that the ticket 1 is in an inverted position by the magnetic recording-reading-writing unit 120, the ticket 1 is inverted by an inverting mechanism 152 so that the front surface will face an electric field applying device including a charger 131 and grounding rollers 132, and a heating device including a thermal head 133. When the ticket 1 is a simple train ticket not provided with the rewritable displaying device 3 and not requiring rewriting, the ticket 1 is conveyed by the conveyor belts 151a to skip over erasing and printing processes.

The information rewriting unit 130 applies an electric field to the reversible displaying element of the rewritable displaying device 3 by the electric field applying device including the charger 131 to be kept separated from the ticket 1, and the grounding rollers 132 to come into contact with the ticket 1 to erase information from the rewritable displaying portion 3. Then, necessary information is recorded and printed in characters and the like on the ticket 1 by the heating device provided with a thermal head 133. If the electric field applying device including the electric field applying device including the charger 131 and the grounding rollers 132, and the heating device provided with the thermal head 133 are disposed on each of the opposite sides of the pass of the ticket 1, the ticket inverting mechanism may be omitted.

Then, the ticket 1 is delivered to the ejecting-recovering unit 140. The ejecting-recovering unit 140 recovers the ticket 1 and sends the same to a recovery box 141 if the validity of the ticket 1 is expired or the ticket 1 is identified as a dishonestly used one or ejects the ticket 1 through an ejecting slot if the ticket 1 is normal to complete a series of rewriting operations.

Figure 8:
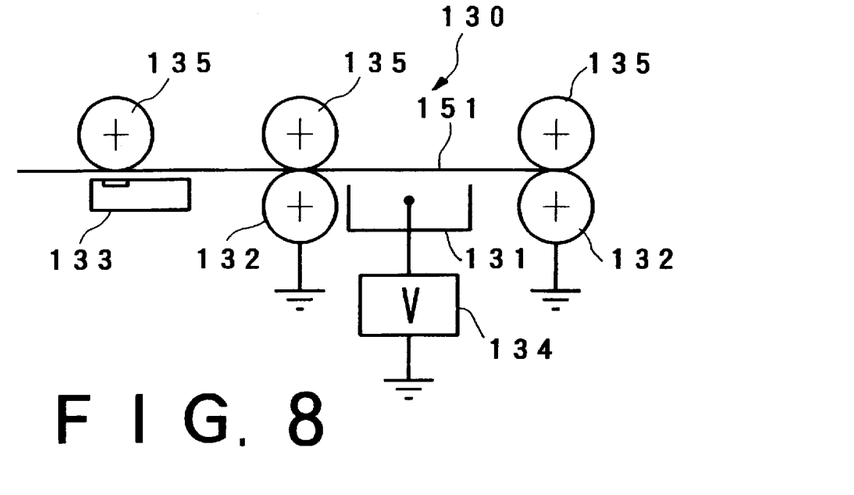
FIG. 8 is a diagrammatic view of an information rewriting unit included in the ticket rewriting apparatus of FIG. 7.
Figure 9:
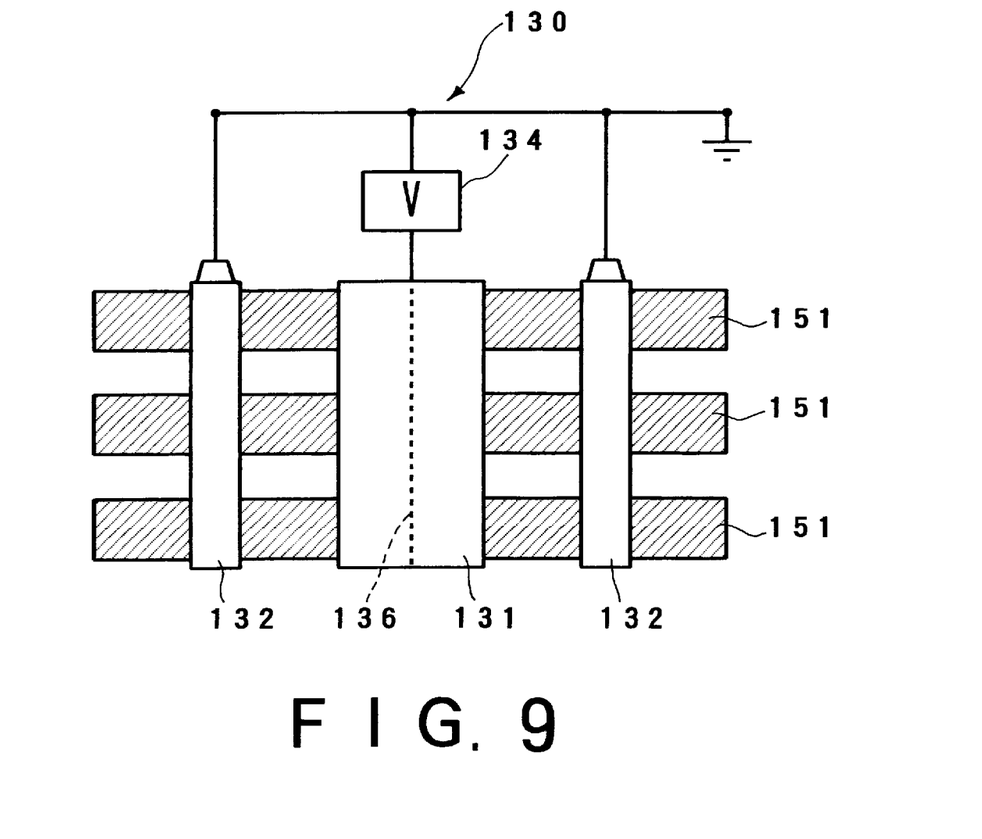
FIG. 9 is a bottom view of an electric field applying unit included in the ticket rewriting apparatus.

FIGS. 8 and 9 show an essential portion of the information rewriting unit 130 shown in FIG. 7 in an enlarged view and an enlarged bottom plan view, respectively. As shown in FIG. 8, a power supply 134 applies a predetermined voltage to the charger 131, and platen rollers 135 are disposed opposite to the grounding rollers 132 and the thermal head 133 to bring the ticket 1 surely into contact with the grounding rollers 132 and the thermal head 133. The ticket 1 is conveyed by the conveyor belts 151, information is erased by voltage application and information is recorded by heat application. Referring to FIG. 9, the charger 131 is a corona charger internally provided with a tungsten wire connected to the power supply 134. The grounding rollers 132 and the power supply are grounded. A potential difference appears across the surface of the ticket 1 charged by the charger 131 and the other surface of the ticket 1 in contact with the grounding rollers 132 to apply an electric field perpendicularly to the reversible displaying element.

The charger 131 may be a known charger, such as a corotron charger or a scorotron charger. The grounding rollers 132 may be metal rollers, plastic or rubber rollers containing a conductive material, such as carbon black. Elastic grounding rollers, such as rubber grounding rollers, are preferable because of their satisfactory contact capability. The thermal head 133 may be a heating means that uses the thermal energy produced by a laser.

The information rewriting unit 130 of the ticket rewriting apparatus 100 of the present invention comprises at least the electric field applying device including the charger 131 and the grounding rollers 132, and the heating means including the thermal head 133 to change the information displayed on the rewritable displaying portion 3 of the ticket 1. The electric field applying device including the charger 131 and the grounding rollers 132, and the heating means including the thermal head 133 may be used for either the recording state or the erasing state, recorded information will not be erased by heat that may be applied to the ticket 1 in the natural environment when the electric field applying including the charger 131 and the grounding rollers 132 are used for the erasing state, so that information can be handled with high reliability. When the ticket rewriting apparatus 100 is provided with the magnetic recording-reading-writing unit 120 capable of recording information on and erasing information from the information recording portion 4, processes for processing the rewritable displaying portion 3 and the information recording portion 4 can be completed. When the magnetic recording-reading-writing unit 120 and the information rewriting unit 130 are not formed in separate, individual units, and the functions of the grounding rollers 132, i.e., grounding electrodes, of the information rewriting unit 130 are carried out by the magnetic heads 121, 122 and 123, the ticket rewriting apparatus 100 can be formed in a smaller construction. Since the ticket rewriting apparatus 100 is capable of recording information on conditions of use on both the information recording portion 4 and the rewritable displaying portion 3. Consequently, the information must be erased from both the information recording portion 4 and the rewritable displaying portion 3 to alter the information dishonestly, which is very difficult and hence a dishonest train ride without paying for the middle part of the journey can be prevented regardless of the confirmation of the visible information by the station staff.

When the information recording portion 4 of the ticket 1 is provided with an information storage means other than the magnetic recording layer 41, such as an optical storage device or an IC storage device, the ticket rewriting apparatus 100 may be provided with a reading-writing unit of a system conforming to the information read-write system of an information storage means employed in the information recording portion 4.

Although the foregoing ticket rewriting apparatus 100 of the present invention has been described as applied to an automatic ticket examining machine to be installed at a railroad station, the present invention may be embodied in a ticket rewriting apparatus provided with only components essential to erasing information from and printing information on the rewritable displaying portion 3 of the ticket 1, an automatic fare adjusting machine or an automatic ticket selling machine.

Various electric field applying methods other than that used by the electric field applying device including the charger 131 and the grounding rollers 132 of the information rewriting unit 130. For example, the present invention may employ any one of a method of applying an electric field to the PDLC film 31 proposed in Japanese Patent Application No. 6-103249 filed by the applicant of the present invention, and methods of applying an electric field to the PDLC film 31 proposed in "Method of Orienting Liquid Crystal in Liquid Crystal Displaying Medium and Liquid Crystal Orienting Apparatus" (charging system) and "Method of Orienting Liquid Crystal in Liquid Crystal Displaying Medium and Liquid Crystal Orienting Apparatus" (electrode system) filed Nov. 14, 1994.

Those electric field applying systems can be classified by various attributes; into a noncontact system and a contact system, a charging system and an electrode system, parallel electrode system that creates a potential difference from one side of the PDLC film and opposed system that creates a potential difference from the opposite sides of the PDLC film, or combinations of those systems. A method of a suitable system may selectively be employed according to the physical properties of a ticket to be dealt with. Incidentally, the electric field means shown in FIG. 7 is of a parallel system, i.e., a combination of a charging system (noncontact system) and an electrode system (contact system). The number of chargers or electrodes is dependent on desired conditions.

For example, in the electrode-charger-electrode arrangement of the electric field applying device including the three electric field applying device including the charger 131 and the grounding rollers 132 shown in FIG. 7, a combined electrode-contact-opposed system is established when the charger 131 disposed at the middle is substituted by an electrode that is not grounded and gives a potential to the PDLC film 31. A combined charging-noncontact-opposed system is established when the grounding rollers (electrodes) 132 on the opposite sides of the charger 131 are substituted by chargers. An electric field applying device comprising two components, i.e., a charger 131 and an electrodes 132, electrodes 132, or chargers 131, may be employed. Naturally, in either arrangement, the adjacent electrodes 132 or the adjacent chargers 131 are charged at different potentials, such as, a ground potential and a positive or negative potential, or a positive potential and a negative potential, respectively. Various other systems and arrangements including an opposed system in which the electrodes 132 or the chargers 131 are disposed on the opposite sides of the ticket 1.

An electric field may be applied to the entire displaying area of the rewritable displaying portion 3 when the information recorded on the rewritable displaying portion 3 may entirely be erased. When the displaying area of the rewritable displaying portion 3 is divided into sections or linear sections, an electric field is applied only to sections or linear sections in which pieces of information to be erased is recorded. For example, when the displaying area of the rewritable displaying portion 3 is divided into linear sections perpendicular to the traveling direction of the ticket 1, an electric field is created only when a linear section in which a piece of information to be erased coincides with the electrode 132 or the charger 131 for partial erasing. When the displaying area is divided in smaller sections and pieces of information in those sections are to be erased selectively for partial erasing, respective potentials of transversely or longitudinally arranged linear contact electrodes or contact electrodes arranged in a matrix are controlled for partial erasing.

Suppose that the rewritable displaying portion 3 is divided into m lines and the n-th (n≦m) line is to be erased. Then, control information requiring erasing the n-th line is stored in the information recording portion 4, the control information is read and a portion of the rewritable displaying portion 3 corresponding to the n-th line is erased. When the rewritable displaying portion 3 is formed over the entire or part of the surface of the ticket and information recorded in a specified area of the rewritable displaying portion 3, the arrival of the leading edge of the ticket at the inlet of the information rewriting unit 130 is detected by the agency of an infrared beam or the like, and then the charger 131 is actuated for a predetermined time after the detection of the leading edge of the ticket.

The operation of the information rewriting unit 130 of the ticket rewriting apparatus 100 in accordance with the present invention is not unstabilized by residual heat, which occurs when an erasing position and a recording position are close to each other for erasing-and-recording operation in a heat-heat mode, and hence the erasing position and the recording position may be close to each other to miniaturize the ticket rewriting apparatus 100.

The present invention will further be described in connection with concrete examples thereof.

EXAMPLE 1

Ticket (Book of Tickets)

A 5 μm thick magnetic recording layer 41 was formed by applying a magnetic dope containing iron oxide, i.e., a magnetic material, by a bar coating process on one surface of a 188 μm thick white polyethylene terephthalate film which serves as a base 2. A 3 μm thick adhesive layer 35, a 2 μm thick conductive layer 32, a 3 μm thick intermediate layer 34, a 7 μm thick PDLC film 31, a 1 μm thick adhesive layer 35 and a 3 μm thick protective layer 33 were formed in that order in an area on the other surface of the base 2 by a thermal transfer process to construct a rewritable displaying portion 3. Then, a white layer and a pattern layer were formed by printing in areas other than that covered by the rewritable displaying portion 3 by a thermal transfer process. Then, the white polyethylene terephthalate film was punched to obtain one of a book of tickets 1 of a required size each provided over the entire back surface thereof with the information recording portion 4 as shown in FIG. 1.

A transfer foil for the thermal transfer process was formed by sequentially forming the protective layer 33 of a ultraviolet setting resin, the adhesive layer 35 of a synthetic resin, the PDLC film 31 similar to that of the first embodiment, the intermediate layer 34 of polyvinyl alcohol, the conductive layer 32 of a conductive dope prepared by dispersing ITO powder in an acrylic resin, and the adhesive layer 35 of a thermosensitive adhesive in that order by coating processes over the entire surface of a polyethylene terephthalate film coated with a surface lubricant as a released seat.

The PDLC film 31 contains, as principal components, the following materials including a liquid crystal and a dichroic dye. The liquid crystal is in an irregularly oriented state for a recording state, and the same is in a vertically oriented state for an erasing state. The dichroic dye becomes black for a recording state and becomes transparent for an erasing state.

PDLC Film

The PDLC film was formed by spreading a microcapsulated dispersed coating liquid prepared by dispersing a liquid crystal (and a dichroic dye) by an in situ polymerizing method using an ultrasonic dispersion process.

Smectic liquid crystal: S-6, Merck Japan Co.

Dichroic dye: S-428, Mitsui Toatsu Kagaku K.K.

Microcapsules: In situ polymerized methylmethacrylate

Protective colloid/polymer matrix: Polyvinyl alcohol KP-06, Nippon Gosei Kagaku Kogyo K.K.

Thickener/Matrix: Polyvinyl alcohol KH-20, Nippon Gosei Kagaku Kogyo K.K.

Liquid crystal/Matrix Ratio: 1/1

EXAMPLE 2

Ticket (Commuter Ticket)

A magnetic recording layer 41 and a rewritable displaying portion 3 similar to those of Example 1 were formed by the same process as those employed in Example 1. The white polyethylene terephthalate film was punched to obtain a commuter ticket 1 of 85 mm by 54 mm having the shape of a card and provided with a rewritable displaying portion 3 in part of the surface thereof and an information recording portion 4 forming the entire back surface thereof as shown in FIG. 2.

EXAMPLE 3

Ticket (Stored Fare Cart)

A 5 μm thick magnetic recording layer 41 over the entire area of one surface of a white polyethylene terephthalate film which serves as a base 2, a 2 μm thick conductive layer 32 entirely covering the magnetic recording layer 41, a 7 μm PDLC film 31 entirely covering the conductive layer 32, and 2 μm thick protective layer 33 entirely covering the PDLC film 31 were formed sequentially in that order by bar coating processes. Materials of those component layers were the same as those of the corresponding component layers of Example 1. The white polyethylene terephthalate film provided with those component layers was punched to obtain a ticket, i.e., a stored fare card, of 85 mm by 54 mm provided with a rewritable displaying portion 3 and a magnetic recording element 41 underlying the rewritable displaying device 3 on one surface thereof as shown in FIG. 3. Five pieces of data on the histories of five times of use can simultaneously be displayed in five lines, respectively, on the rewritable displaying portion 3. Each piece of data on the history of each time of use is recorded every time the ticket is used, and the oldest one of the five pieces of data is rewritten when recording an additional piece of data.

EXAMPLE 4

Ticket Rewriting Apparatus

A ticket rewriting apparatus 100 of the present invention as shown in FIG. 7 was constructed by incorporating the information rewriting unit 130 comprising the fixedly disposed electric field applying means and the heating means into a known automatic train ticket examining apparatus. The electric field applying device including the charger 131 and the grounding electrodes (grounding rollers) 132 was used for erasing information from the rewritable displaying portion 3, and the heating portion including the thermal head 133 was used for recording information on the rewritable displaying portion 3. The electric field applying device and the heating device were disposed on one side of the passage along which the ticket is conveyed.

The charger 131 and the grounding electrodes (grounding rollers) 132 of the electric field applying device were formed in such sizes that an electric field can be applied to the ticket 1 across the entire width of the ticket 1. This electric field applying device is of a combined system of a charging system and an electrode system in principle or of a combined system of a noncontact system and a contact system in arrangement, and a parallel electrode system. The the rewritable displaying portion 3 was charged at +5 kV for information erasing. The heating device employed, as the thermal head 133, a thermal head for a thermal printer. The thermal head was six dot/mm in resolution and 0.4 mJ/dot in heating capacity.

EXAMPLE5

Ticket Rewriting Apparatus

A ticket rewriting apparatus in Example 5 was substantially the same in construction as the ticket rewriting apparatus in Example 4, except that the former was provided with an information rewriting unit 130 including an electric field applying device of an electrode system. The information rewriting unit 130 is of a combined system of an electrode system in principle or a contact system in arrangement, and a parallel electrode system.

The electric field applying device was provided with two electrode rollers 132 of 60 mm in length and 10 mm in diameter capable of being contact with one surface of the ticket 1 delivered thereto across the entire width of the same. The electrode rollers 132 were disposed adjacently at an interval of 12 mm between the axes thereof. The potential of one of the electrode rollers 132 was +400 V and that of the other was 0 V (grounding electrode).

Results of Rewriting Operation

Tickets in Examples 1, 2 and 3 were subject to an information rewriting process on the ticket rewriting apparatus 100 in Example 4 for performance tests. The PDLC film 31 withstood 1000 rewriting cycles. Thus, the commuter ticket withstood 1000 rewriting cycles and the stored fare card withstood 5000 rewriting cycles.

As is apparent from the foregoing description, since the ticket of the present invention is provided with the information recording portion on which information can be recorded by magnetic recording or the like, and the rewritable displaying portion including a reversible displaying element to which visible information can be written and from which visible information can be erased, and both heat and an electric field are used for writing and erasing, respectively, the dishonest alteration of the information written to the rewritable displaying device is difficult. Accordingly, the rewritable displaying portion is able to display information with high reliability and has an excellent effect in preventing the dishonest use of the ticket to steal a train ride. Since a ticket is used to gain admission to transport facilities at the starting station and a commuter ticket is used to gain admission to leave transportation facilities at the destination when dishonestly using the commuter ticket to steal a train ride, it is effective to display the history of conditions of use when giving admission to the transport facilities in preventing such dishonest use of the commuter ticket.

Since the information written an the rewritable displaying device is erased by the agency of an electric field, a voltage not less than a predetermined voltage must be applied to the rewritable displaying portion in a prescribed mode to erase the written information. Such information erasing conditions can not be achieved naturally. Therefore, the natural fading of information in a hot environment, which is liable to occur with information that is to be erased by heat, will not occur, and hence information can be displayed with high reliability.

Since the reversible displaying element of the rewritable displaying portion comprises the PDLC film, the ticket has a high durability.

Since the liquid crystal phase of the PDLC film of the rewritable displaying portion contains the dichroic dye to use a guest-host effect for displaying, information can be displayed in an improved visibility.

Since the magnetic recording layer of the information recording device records invisible information, the ticket rewriting apparatus of the present invention can be designed through the modification of various conventional automatic ticket examining apparatuses designed to examine magnetic tickets, and hence the ticket rewriting apparatus of the present invention can easily and widely be applied to practical uses.

Since the ticket rewriting apparatus of the present invention uses different means, i.e., heat and an electric field, or an electric field and heat for information recording and information erasing, respectively, the heating means and the electric field applying means can be disposed close to each other, which enables the miniaturization of the ticket rewriting apparatus and rapid information rewriting.

The use of an electric field for erasing information recorded on the rewritable displaying portion and heat for recording information on the rewritable displaying portion is highly practical.

Since the ticket rewriting apparatus is provided with the recording-reading-erasing means for recording information on, reading information from and erasing information from the information recording portion, information can be recorded on both the information recording portion and the rewritable displaying portion and information can be erased from both the information recording portion and the rewritable displaying device.

Since the grounding electrodes of the electric field applying portion serves also as the magnetic head of the recording-reading-erasing means for the information recording device including the magnetic recording layer, the ticket rewriting apparatus can further be miniaturized and further rapid processing is possible.

I claim:

1. A ticket comprising:

a base;

an information recording portion provided on the base for recording invisible information; and a rewritable displaying portion provided on the base for repeated visible information recording and erasing;

wherein said rewritable displaying portion includes a reversible displaying element that is changed from a recording state to an erasing state by an electric field and that is changed from an erasing state to a recording state by heat.

2. The ticket according to claim 1, wherein the reversible displaying element of the ticket includes a polymer dispersed liquid crystal film.

3. The ticket according to claim 2, wherein a liquid crystal phase of the polymer dispersed liquid crystal film contains a dichroic dye that assumes by operation of one of said electric field and heat a displaying state by guest-host effect.

4. The ticket according to claim 2, wherein
the reversible displaying element further comprises a conductive layer underlying the polymer dispersed liquid crystal film, and a protective layer overlying the polymer dispersed liquid crystal film.

5. The ticket according to any one of claims 1, wherein
the information recording portion comprises a magnetic recording layer.

6. The ticket according to claim 1, wherein
the information recording portion is formed on one of the surfaces of the base, and the rewritable displaying portion is formed on the other surface of the base.

7. The ticket according to claim 6, wherein
the information recording portion is formed over the entire area of said one of the surfaces of the base, and the rewritable displaying portion is formed over a portion of said other surface of the base.

8. A ticket rewriting apparatus for writing information on and erasing information written on a ticket comprising: a ticket having said base; an information recording portion provided on the base for recording invisible information; and a rewritable displaying portion provided on the base for repeated visible information recording and erasing;
wherein said rewritable displaying portion includes a reversible displaying element that is changed from a recording state to an erasing state by an electric field and that is changed from an erasing state to a recording state by heat; said ticket rewriting apparatus further comprising an electric field applying means for applying an electric field to said rewritable displaying portion to change the recording state of said rewritable displaying portion to the erasing state; and a heating means for applying heat to said rewritable displaying portion to change the erasing state of said reversible displaying portion to the recording state.

9. The ticket rewriting apparatus according to claim 8, wherein
the electric field applying means sets the rewritable displaying portion in the erasing state, and the heating means sets the rewritable displaying portion in the recording state.

10. The ticket rewriting apparatus according to claim 8, further comprising:
a recording-reading-erasing means for recording information on, reading information from and erasing information from the information recording portion.

11. The ticket rewriting apparatus according to claim 10, wherein
the electric field applying means has electrodes to be brought into contact with the surface of the ticket to charge the ticket at a ground potential, and the electrodes serve also as the recording-reading-erasing means for recording information on, reading information from and erasing information from the information recording portion.

* * * * *